United States Patent
Wurdinger (10) Patent No.: US 9,423,139 B2
(45) Date of Patent: Aug. 23, 2016

(54) CONDENSATION MANAGEMENT SYSTEM AND METHOD

(71) Applicant: Convotherm Elektrogeraete GmbH, Eglfing (DE)

(72) Inventor: Gunter Wurdinger, Peibenberg (DE)

(73) Assignee: CONVOTHERM ELEKTROGERAETE GMBH, Eglfing (DE)

(*) Notice: Subject to any disclaimer, the term of this patent is extended or adjusted under 35 U.S.C. 154(b) by 391 days.

(21) Appl. No.: 13/854,364

(22) Filed: Apr. 1, 2013

(65) Prior Publication Data

US 2014/0291312 A1    Oct. 2, 2014

(51) Int. Cl.
*A21B 1/00* (2006.01)
*F24C 15/32* (2006.01)
*F28B 3/04* (2006.01)
*F24C 15/20* (2006.01)
*A21B 3/04* (2006.01)

(52) U.S. Cl.
CPC ............... *F24C 15/327* (2013.01); *A21B 3/04* (2013.01); *F24C 15/20* (2013.01); *F28B 3/04* (2013.01)

(58) Field of Classification Search
CPC ......... A21B 3/04; F24C 15/20; F24C 15/327; F28B 3/04
USPC ............... 219/401; 126/19 R, 20, 21 A, 21 R
See application file for complete search history.

(56) References Cited

U.S. PATENT DOCUMENTS

| 3,802,329 | A | 4/1974 | Wright |
| 6,019,819 | A | 2/2000 | Williams |
| 7,155,360 | B2 | 12/2006 | Shinohara |
| 2008/0105138 | A1* | 5/2008 | Segato ............................ 99/447 |
| 2011/0072983 | A1 | 3/2011 | Helm |

FOREIGN PATENT DOCUMENTS

| DE | 8902903 U1 | 8/1989 |
| DE | 10160152 A2 | 6/2003 |
| DE | 102007024007 A1 | 11/2008 |

(Continued)

OTHER PUBLICATIONS

Extended Search Report dated Jun. 3, 2014 for European patent application No. 13001730.4.

(Continued)

*Primary Examiner* — Dana Ross
*Assistant Examiner* — Joseph Iskra
(74) *Attorney, Agent, or Firm* — Ohlandt, Greeley, Ruggiero & Perle, LLP (57) ABSTRACT

The present disclosure provides a system and method of condensation of a steam flow produced in a cooking device. The condensation system and method provides a vent pipe configured to be non-linear for providing a path for the steam flow. The condensation system and method also provides a spray nozzle which is positioned to spray water in substantially in alignment with the path of the steam flow. The system and method of increases condensation of the steam flow within the vent pipe, and the condensed steam is drained from the cooking device, producing a minimal amount of steam that is vented outside of the cooking device. The system and method of the present disclosure provide higher efficiency of condensation of steam and an overall smaller amount of atmospheric venting of steam.

16 Claims, 7 Drawing Sheets

(56) References Cited

FOREIGN PATENT DOCUMENTS

| | | |
|---|---|---|
| DE | 202011051026 U1 | 10/2011 |
| EP | 0388751 A1 | 9/1990 |
| EP | 0845234 A1 | 6/1998 |
| GB | 2010078 A | 6/1979 |

OTHER PUBLICATIONS

Second Written Opinion dated Aug. 10, 2015 for PCT application No. PCT/IB2014/000431.

* cited by examiner

CONDENSATION MANAGEMENT SYSTEM AND METHOD

BACKGROUND

1. Field of the Disclosure

The present disclosure relates to a system and method for providing a condensation management system and method for a commercial cooking device. The system and methods include one or both of reconfigured a vent pipe and repositioning of a spray nozzle.

2. Discussion of the Background Art

A commercial cooking device comprises a cooking chamber enclosed by a door that can be opened and closed for providing access to the cooking chamber. Such cooking devices, such as combi-ovens, produce steam during the cooking process, either by: (1) the release of steam from the food product being cooked resulting from the inherent internal moisture of the food product, or (2) by the introduction of water sprayed into the cooking chamber or produced by a steam generator within the cooking appliance for cooking the food product in a higher humidity environment.

When a large amount of steam is released under the above conditions, excess steam must be allowed to escape and a way of doing this must be provided. Otherwise, pressure could build up within the cooking chamber. In order to manage humidity buildup in the oven, conventional cooking apparatuses have an exhaust air opening from which the steam can escape from the cooking chamber into the kitchen atmosphere. In the case of high performance cooking devices and those having long hours of service in a twenty four hour period, this can lead to a large accumulation of moisture and heat in the kitchen atmosphere surrounding the cooking device and often in the entire premises where the cooking device is located as well. Hence, adequate ventilation and exhaust measures are required where such cooking devices having a relatively high food capacity are installed. The rate of air exchange necessarily associated with these ventilation and exhaust measures results in a high energy requirement for the ventilation and exhaust, as well as additionally for the cooling of the premises air.

In light of the above, the cooking chamber may need to have steam removed as condensation as part of the cooking process or for safety reasons before the door is opened. When this condensation of steam from the cooking device needs to occur, the steam is generally forced out of the cooking chamber, circulated over a water surface located in one or more condenser boxes outside of the oven to condense some of the steam, and excess non-condensed steam is vented from the cooking device through a vent pipe directly into the kitchen atmosphere. Although some steam is condensed by these commercial cooking devices and methods, very large quantities of steam are produced are still released into the kitchen and require further ventilation from the kitchen.

There have been attempts to improve the treatment of steam produced in commercial cooking devices and to increase the amount of steam which is condensed so that more steam can be removed from the cooking device as condensate. This also has the goal of reducing the amount of steam released into the kitchen and thereafter requiring venting from the kitchen.

In one such state of the art method and system for removing steam from a cooking device, the steam is forced into a condenser box and flows across the surface of a water reservoir in the condenser box. However, there is insufficient surface area to effect good heat transfer between the water reservoir in the condenser box and the steam passing over its surface. As a result, a significant amount of steam escapes through the vent pipe of the cooking device and into the kitchen atmosphere.

In other embodiments of the above state of the art method and system for removing steam from a cooking device, a nozzle is placed in the condenser box above the surface of the water reservoir, or a nozzle is placed directly into the vent pipe of the cooking device. In either situation, water is sprayed forcefully in a direction countercurrent to the path or flow of the steam traveling through the vent pipe. Even with these state of the art systems and methods, a significant amount of steam escapes through the vent pipe of the cooking device and into the kitchen atmosphere.

Another state of the art method and system for removing steam from a cooking device is disclosed in U.S. Pat. Pub. 2011/0072983 (equivalent to DE 10 2008 01296). Therein, a more or less serpentine vapour channel is used to increase the path length of the flow of steam as it is in the vapour condenser. In addition to this increase in path length, this state of the art method and system sprays water into contact with the vapour channel. Although this system and method represents an improvement as compared to those systems and methods discussed above, a significant amount of steam is still expelled to the outside of the cooking device.

U.S. Pat. No. 6,995,341 discloses another example of a state of the art method and system for removing steam from a cooking device. In this method and system, water is sprayed from a spray nozzle inside the cooking chamber in a direction generally the same as the path or flow of the steam. However, in this method and device, the spray nozzle is located in the cooking chamber (separated by partition). The condensed steam passes through a condensation trough adjacent the bottom of the cooking chamber of the cooking device, such that the sprayed water and condensed steam pass into the condensation trough and then down an outflow drain and into the condenser box. Condensed steam flows out of the cooking device via a drain pipe into the condenser box. This system and method do not face the problem of excess steam possibly passing through the vent pipe and into the surrounding atmosphere.

Thus, there remains a need for a method and system which improves the degree of condensation of steam produced in a commercial cooking device, thereby resulting in less steam being expelled through the vent pipe of the cooking device and into the atmosphere outside of the cooking device, such as into the kitchen atmosphere. Such a method and system will reduce or avoid altogether the need for additional venting of the steam from the kitchen atmosphere to an external atmosphere outside of the kitchen.

SUMMARY

The condensation system and method of the present disclosure provides for circulating steam produced in a cooking device through reconfigured vent piping. Also, contrary to several of the methods and systems of the state of the art (in which water is sprayed from a nozzle located outside of the cooking chamber in a direction countercurrent to the path of the steam) the present disclosure proceeds in a direction which is counter-intuitive. Specifically, according to the present disclosure, water is sprayed in substantial alignment with the steam air flow path in the vent pipe. This greatly increases condensation within the vent pipe, and the condensation is drained out of the oven system, producing a minimal amount of steam that is vented into the atmosphere. The advantages of the present disclosure include higher efficiency of condensation, and an overall smaller amount of atmospheric venting.

In one embodiment, the present disclosure provides a cooking device having a cooking chamber, a vent pipe for allowing a steam flow from the cooking device to exit the cooking device into the atmosphere, and a spray nozzle for condensation of the steam flow comprising a vent pipe that is in a non-linear configuration and a spray nozzle located outside of the cooking chamber, wherein the spray nozzle sprays water into the steam flow substantially in alignment with the steam flow to effect condensation of the steam flow and wherein the non-linear configuration of the vent pipe prevents water sprayed from the spray nozzle to escape the cooking device.

In another embodiment, the present disclosure provides a method of condensation of steam flow produced in a cooking device, the cooking device having a cooking chamber, a vent pipe for allowing a steam flow from the cooking device to exit the cooking device into the atmosphere, and a spray nozzle for condensation dehumidification of the steam, the method comprising providing a vent pipe with a non-linear configuration, and positioning the spray nozzle to spray water into the steam flow substantially in alignment with the steam flow, to effect dehumidification of the steam flow.

BRIEF DESCRIPTION OF THE DRAWINGS

Further advantageous features and details of the present disclosure will become apparent from the following description of the drawings, in which.

DETAILED DESCRIPTION OF THE DISCLOSURE

In the description which follows, like elements in the Figures are designated with like reference numbers.

Figure 1:
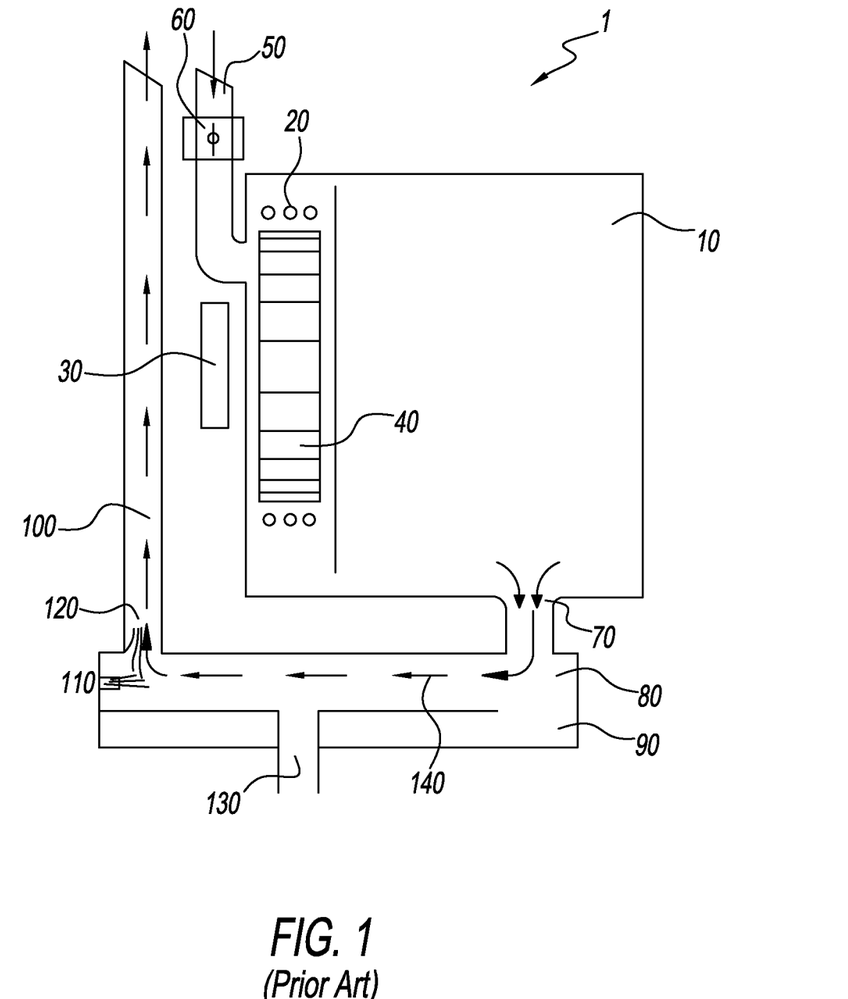
FIG. 1 is a cross-sectional side view of a state of the art cooking device having a plurality of components for condensing steam released from the cooking chamber.

Further features, advantages and details of the present disclosure will become apparent from the following description of the drawings in which:

FIG. 1 shows an example of a state of the art cooking device having a system for condensing steam exiting a cooking chamber 10. A cooking device 1 has cooking chamber 10, a heating elements 20, a motor 30, a fan wheel 40, an air inlet 50 in which there is a flap 60, a drain 70 in the bottom of cooking device 1 that leads to a condenser box 80 in which there is a water reservoir 90 and a vent pipe 100 through which steam is vented into the atmosphere outside of the oven. The depth of water reservoir 90 is maintained by a drain 130, the upper edge of which acts as an overflow level for water reservoir 90. These components of cooking device 1 are known to those skilled in the art.

In cooking device 1 of FIG. 1, when flap 60 is opened air is drawn from the atmosphere outside of cooking device 1 into coking chamber 10. Fan wheel 40, in operation, causes a reduced pressure behind fan wheel 40 that causes fresh air to enter cooking chamber 10 via air inlet 50. When flap 60 opens, air, mixed with steam (from the cooked food or resulting from the situation in which steam is used in the cooking process) escapes downward to the bottom of cooking chamber 10, through drain 70, across the surface of water reservoir 90 in condenser box 80, then proceeds upward through vent pipe 100 and is expelled directly into the kitchen atmosphere along steam path 140. While in this configuration of cooking device 1 part of the steam traveling along steam path 140 is condensed in the condenser box 80 due to contact with the surface of water reservoir 90, there is insufficient water surface area to condense all, or even much, of the steam in steam path 140. This creates the problem of having to vent a significant amount of uncondensed steam directly into the atmosphere outside of cooking chamber 10.

In some embodiments, cooking device 1 may have water nozzle 110 located in condenser box 80 through which water is sprayed into condenser box 80, countercurrent to steam path 140 of the steam escaping or being forced from cooking chamber 10. In other embodiments, cooking device 1 may have water nozzle 120 located within vent pipe 100 near the lower portion of vent pipe 100 near or adjacent to condenser box 80. Nozzle 120 is configured to spray water into vent pipe 100, again countercurrent to steam path 140 through vent pipe 100.

Figure 2:
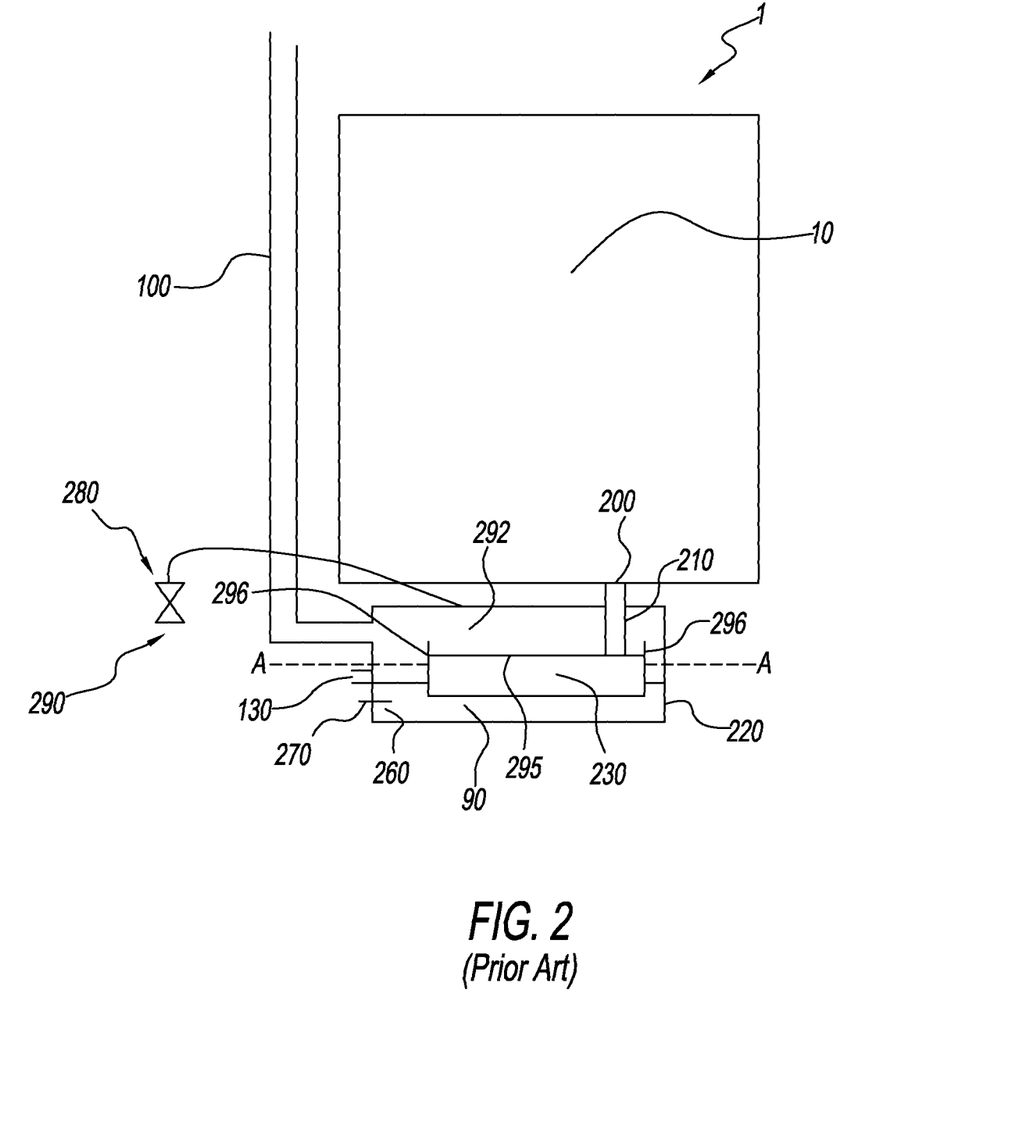
FIG. 2 is a cross-sectional side view of another state of the art cooking device having a plurality of components for condensing steam released from the cooking chamber.
Figure 3:
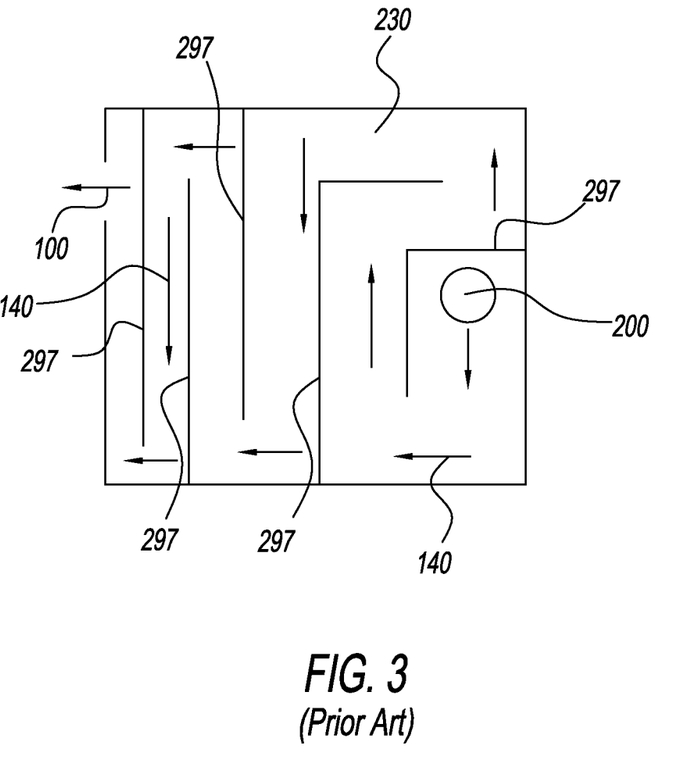
FIG. 3 is a cross-sectional overhead view of a portion of the cooking device of FIG. 2 through line "A"-"A"

FIG. 2 (which is FIG. 1 from the above-mentioned U.S. Pat. Pub. 2011/0072983; DE 10 2008 01296) shows another state of the art cooking device 1 having an alternative system and method for condensing steam from oven chamber 10 (similar to oven chamber 10 in FIG. 1, above). In this cooking device 1, the air/steam mixture flows through drain a 200 into a vapor condenser 210 and further into a container 220 (holding reservoir 90) within which there is a vapor guide 230 that directs the steam flow path across the surface of water reservoir 90 in container 220. The depth of reservoir 90 is determined by, in this case, the lower edge of drain 130. Vapor guide 230 pathway is shown in FIG. 3 (which is FIG. 2 from U.S. Pat. Pub. 2011/0072983; DE 10 2008 01296), with the arrows showing steam path 140 through vapor guide 230 and into vent pipe 100, with steam path 140 (see, FIG. 1) defined by internal walls 297 of vapor guide 230. The system of FIG. 2 also has a temperature sensor 260, connected to a control 270 that controls a valve 280 that regulates a feed 290 of fresh water to container 220 through an inlet 292, and hence to reservoir 90, to maintain the temperature of reservoir 90 at a desired temperature. Vapor guide 230 has an upper wall 295 and disposed vertically in relation to upper wall 295 are raised edges 296 that serve to maintain a level of water from inlet 292 on upper wall 295 of vapor guide 230. While this system and process is an improvement over that of FIG. 1 because it enables more condensation to occur, there is still a significant excess of steam that is expelled through vent pipe 100 into the atmosphere outside of cooking device 1.

Figure 4:
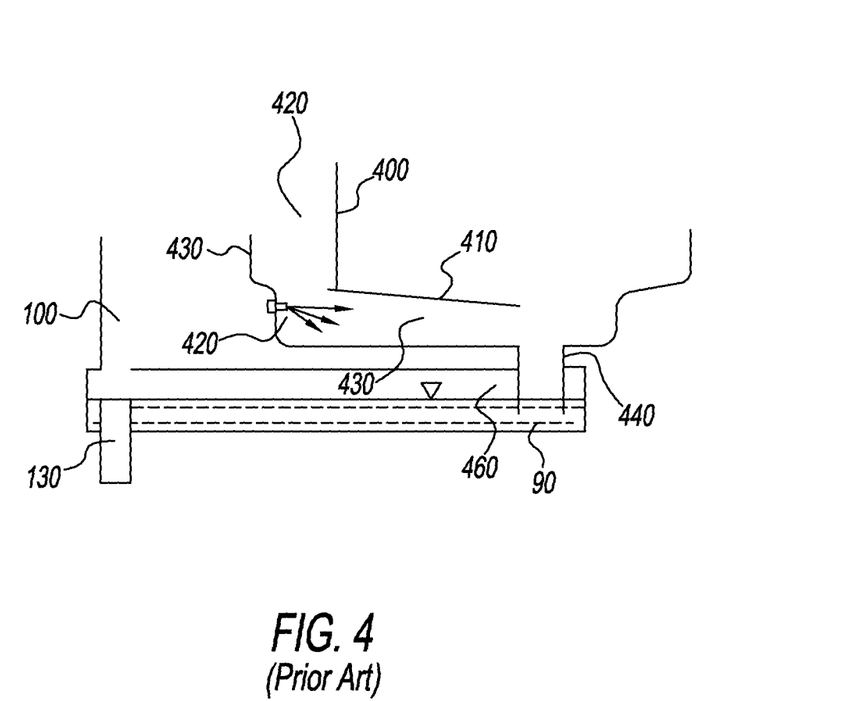
FIG. 4 is a partial side cross-sectional view of a third state of the art cooking device having a plurality of components for condensing steam within the cooking chamber.

Another example of a state of the art condensation system and method is shown in FIG. 4 (which is FIG. 3 from the above-mentioned U.S. Pat. No. 6,995,341). In this example, the condensation system is located entirely inside cooking chamber 10. This condensation system is separated from cooking chamber 10 by a separation sheet 400 and a splash guard 410. Separation sheet 400 is disposed substantially vertically in cooking chamber 10. Water is sprayed from an injection nozzle 420, such that the sprayed water and condensed steam flow into the condensation trough 430 in the bottom of cooking chamber 10, then down an outflow 440 and into reservoir 90 in condenser box 80. The condensed steam in the form of water flows out of the cooking appliance via drain pipe 130. Because the condensed steam is held within a closed chamber (comprised of outflow 440 disposed into reservoir 90 in condenser box 80 and then out drain pipe 130, there is no steam to escape through vent pipe 100.

Figure 5:
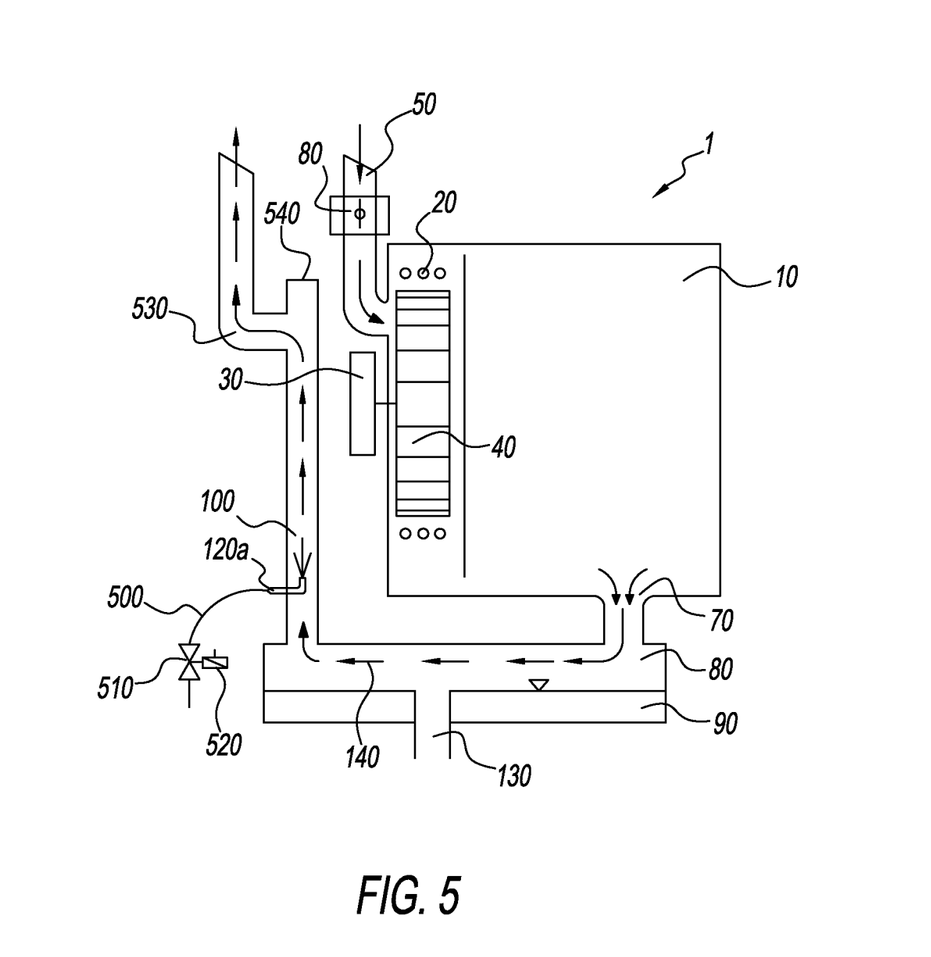
FIGS. 5-6 show embodiments of systems and methods for venting steam from a cooking device according to the present disclosure.
Figure 6:
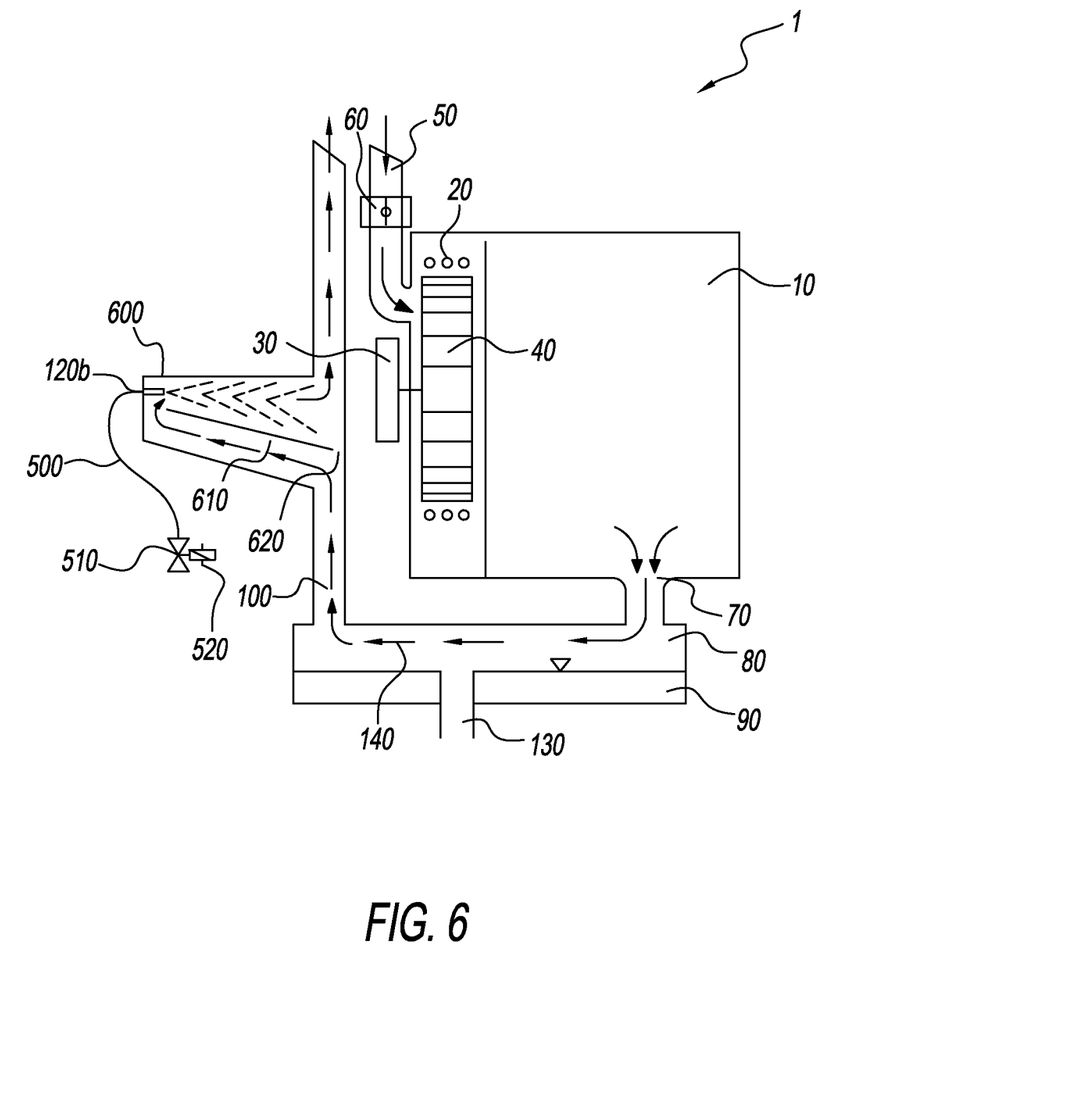

FIGS. 5-6 show dehumidification systems and methods according to the present disclosure. In FIGS. 5-6, cooking device 1 comprises generally a configuration similar to the cooking device 1 of FIG. 1 having oven chamber 10, heating elements 20, motor 30 that drives fan wheel 40, air inlet 50 in which there is flap 60, drain 70 in the bottom of cooking device 1 that leads into condenser box 80 in which there is water reservoir 90, and vent pipe 100 that leads into the atmosphere outside of cooking device 1 through which steam is vented. FIGS. 5-6 also show a water valve 510 and a solenoid 520, with water valve 510 connected to a water supply line 500 through which cold water flows into spray nozzle 120A in FIG. 5 or spray nozzle 120B in FIG. 6. Spray nozzles 120A and 120B spray water into steam path 140 substantially in alignment with steam path 140 inside vent pipe 100.

By "substantially in alignment" is meant that the direction of the spray of water from spray nozzle 120A or 120B travels in the same general direction as steam path 140. More specifically, "substantially in alignment" means that the direction of the spray of water from nozzle 120A or 120B intersects with steam path 140 at an acute angle. In other words, if steam path 140, when traveling through vent pipe 100 is considered as traveling in a vertical direction (or 0°), then the spray of water from nozzle 120A or 120B impacts or makes contact with steam path at an angle of incidence of less than 90°. Preferably, the angle of incidence at which the spray of water from water nozzle 120A or 120B makes contact with steam path 140 is less than 60°, more preferably less than 45°, still more preferably less than 20°, especially preferably less than 10°, and most preferably at about 0°.

Also, the embodiments of the condensation systems and methods of the present disclosure preferably provide for vent pipe 100 having a non-linear section above the point where spray nozzle 120A or 120B sprays water into steam path 140. In other words, according to the present disclosure, vent pipe 100 has a non-linear portion above the point where spray nozzle 120A and 120B sprays water into steam path 140 and before vent pipe empties into the atmosphere outside of vent pipe 100. The non-linear portion may be of any length or configuration. Two embodiments of such non-liner portion above the point where spray nozzle 120A and 120B sprays water into steam path 140 are shown in FIGS. 5-6.

In FIG. 5, vent pipe 100 has a curved section 530 that branches off vent pipe 100, and vent pipe 100 is capped at its nominal end 540. When water is sprayed from spray nozzle 120A substantially in alignment with steam path 140, the steam is condensed into water. The condensate (water) so produced flows down the inside of vent pipe 100 and drains back into condenser box 80, the excess of such condensate is then drained out of the cooking device 1 via downpipe drain 130. Any minimal steam that remains after this condensation process flows out of vent pipe 100 into the atmosphere.

An alternative embodiment of non-linear vent pipe 100 is shown in FIG. 6. In FIG. 6, vent pipe extension 600 acts as a secondary condenser. Within vent pipe extension 600 is flow path guide 610 that extends downwardly from near the outside rear end of vent pipe extension 600 into a portion of vent pipe 100 leaving gap 620 within vent pipe 100. This gap allows an unimpeded pathway provided by gap 620 within vent pipe 100 through which condensed steam (water) can flow. Based on the Venturi principle, due to water spray from spray nozzle 120B, steam is sucked into vent pipe extension 600. Within vent pipe extension 600 water spray nozzle 120B is preferably positioned above guide 610 to spray water substantially in alignment with steam path 140 within vent pipe extension 600. Of course, spray nozzle 120B could alternatively be positioned below guide 610 yet still spray water in substantial alignment with steam path 140 in accordance with the present disclosure.

In each embodiment of FIGS. 5 and 6, the water produced by this condensation system and process flows downward along guide 610 into and along the sides of vent pipe 100, into condenser box 80 and subsequently can be drained via drain 130.

Several alternatives of non-linear vent pipe 100 are shown in FIGS. 7A-C. In FIG. 7A, the non-linear vent pipe 100 is shown as a perforated disc 700 disposed above nozzle 120A and below the opening of vent pipe 100 leading to the atmosphere. This embodiment assists in preventing water sprayed from spray nozzle 120A being uncontrollably spouted out of the end of vent pipe 100 into the atmosphere. One embodiment of perforated disc 700 is shown as 710. Of course, more than one perforated disc 700 may be used. Other possible alternatives of perforated disc(s) include those shown as 720, wherein the perforations are slots 730 in perforated disc(s) 720. In the embodiment of perforated disc(s) 720, where a plurality of perforated discs 720 are utilized, these can preferably be disposed in vent pipe 100 in "offset" alignment such that slots 730 are not in alignment one with the other. Moreover, although perforated disc 700 is shown as straight in FIG. 7A, perforated disc 700, whether in the design of 710 or 720 may be curved in a concave or convex manner with respect to the opening of vent pipe 100 leading to the atmosphere. In FIG. 7B, an additional alternative embodiment of non-linear vent pipe 100 includes a baffle arrangement of a series of downwardly facing plates 740 that also assist in preventing water sprayed from nozzle 120A being uncontrollably spouted out of the end of vent pipe 100 into the atmosphere. While FIG. 7B shows an arrangement of four (4) such downwardly facing plates, as few as at least one (1) downwardly facing plates may be used (and of course more than one in any configuration such downwardly facing plates 740 may be employed), although such an arrangement with one (1) downwardly facing plate 740 may not be as effective as a plurality of such downwardly facing plates 740. Also, while FIG. 7B show downwardly facing plates, these plates may alternatively be upwardly facing. All that is required is that the plates (either downwardly or upwardly facing) perform the function of impeding the water from spray nozzle 120A exiting vent pipe 100 uncontrollably into the atmosphere. In FIG. 7C vent pipe 100 is configured in much the same way as a drain trap common to plumbing and this also serves to assist in preventing water sprayed from nozzle 120A from being uncontrollably spouted out of the end of vent pipe 100 into the atmosphere. In this embodiment, vent pipe is configured having at least two (2) reversing bends. However, distinct from the reversing bends of a common plumbing drain trap in which a level of water is intended to be retained in the series of bends in the plumbing drain trap, the configuration of vent pipe 100 of FIG. 7C is different. Specifically, in the embodiment of FIG. 7C, the upper edge 750 of first bend 760 must be disposed lower than lower edge 770 of second bend 780. This is so that steam flow 140 is not blocked by a level of water trapped between upper edge 750 and lower edge 770. If steam flow 140 were trapped, the undesirable situation where steam could no escape cooking device 1 would occur.

Figure 7:
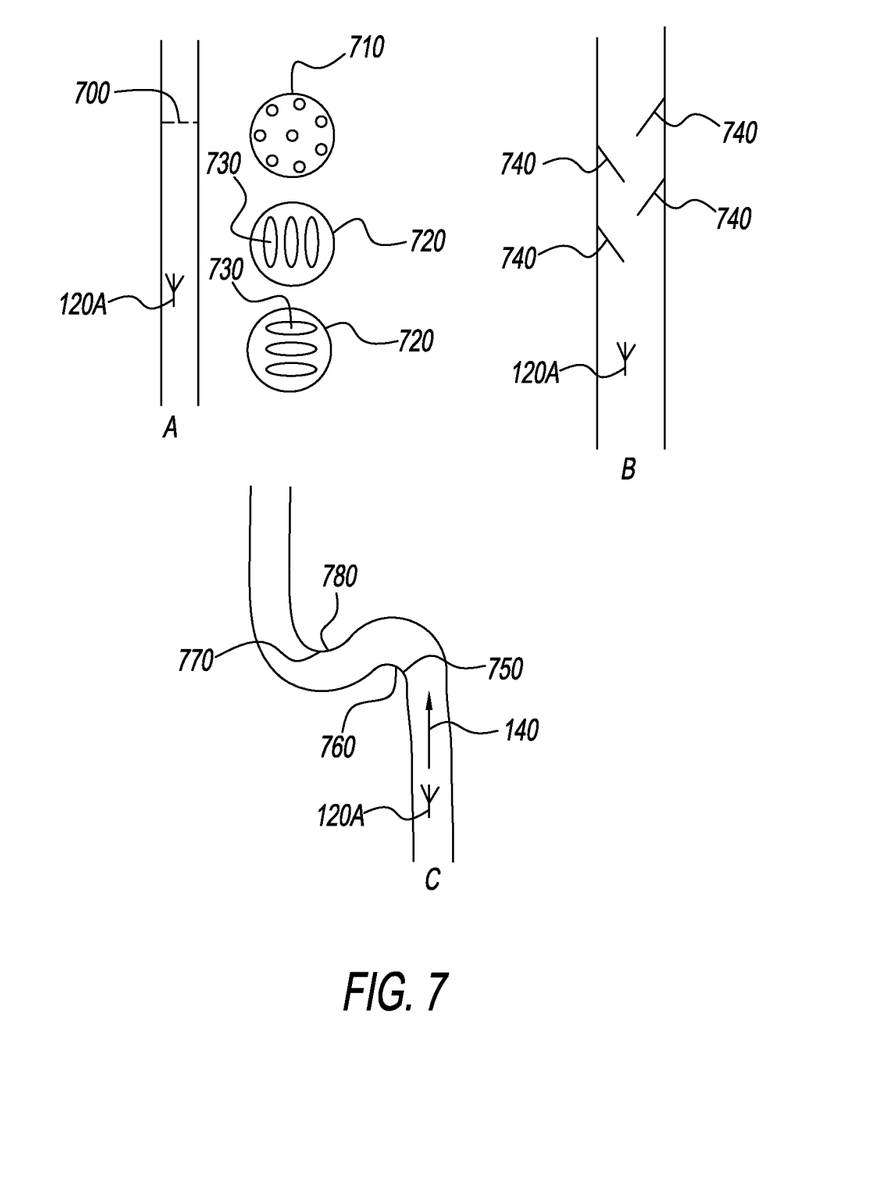
FIGS. 7A-C show alternative embodiments of disadvantages of the systems and methods of the state of the art stream venting configurations.

All of the embodiments of non-linear vent pipe 100 shown in the FIGS. 5-7 are included in the term "non-linear" as used herein. Other embodiments of non-linear vent pipe 100 will become apparent to those of skill in the art based upon the descriptions shown herein.

Nozzles 120A and 120B can be activated in either an automatic mode or manual mode. In automatic mode, a setting can be made during manufacturing of cooking device 1 that pre-adjusts activation of nozzles 120A and/or 120B and/or pre-adjusts de-activation of same to occur consistent with the recipe parameters (types of foods, cook times, condensation times) being used in cooking device 1. Alternatively, in manual mode, the operator of cooking device 1 can activate the condensation cycle by pushing a button or switch to activate condensation and such activation may be made with or without selecting the number of cycles or the length of cycles of activation of nozzles 120A and/or 120B.

The present disclosure solves the common problem of excess steam not fully condensed within the cooking appliance and, as a result, significant excess steam being vented into the atmosphere by the configuration. Use of non-linear vent pipe 100 in which water may be sprayed substantially in alignment with the steam path 140 effectively and efficiently condenses the steam. In accordance with the present disclosure, the majority of steam drains out of cooking device 1 in the form of water which may then flow into drain 130. As a result, very little residual steam escapes into the atmosphere outside cooking device 1.

There are disadvantages if a spray nozzle 120 is positioned in vent pipe 100 to spray water in a direction countercurrent to steam path 140. In this circumstance, a water curtain is created that blocks steam path 140 within vent pipe 100 and also prevents cooking device 1 from being able to draw fresh dry air into cooking chamber 10. This situation substantially reduces the effectiveness of the dehumidification of cooking chamber 10. There are also disadvantages if a water spray nozzle is positioned in linear vent pipe 100, even if so positioned to spray water substantially in alignment with steam flow 140. If spray nozzle 120 is positioned lower in vent pipe 100 and vent pipe 100 does not have a non-linear configuration, then water sprayed in substantial alignment with steam path 140 will likely be ejected out of vent pipe 100 into the atmosphere, creating a geyser-like effect and also causing unsanitary (cooking residues expelled) and potentially dangerous (slippage) conditions in the area where cooking device 1 is located.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the patents and publications mentioned in the present disclosure are incorporated by reference herein as if set forth fully herein.

What is claimed is:

1. A cooking device comprising:
    a cooking chamber, wherein the cooking chamber has a top and a bottom and a drain disposed in the bottom,
    a vent pipe for allowing a steam flow from the cooking device to exit the cooking device to the atmosphere, and
    a spray nozzle for condensation of the steam flow,
    wherein the vent pipe is disposed vertically outside of the cooking chamber between the top and the bottom, and wherein the vent pipe has (a) an entrance in communication with the drain for receiving the steam flow from the cooking chamber into the vent pipe, (b) an exit in communication with the atmosphere for allowing the steam to flow from the vent pipe to the atmosphere, (c) a non-linear configuration disposed between the entrance and the exit, (d) a vertical section disposed between the entrance and the non-linear configuration and (e) a vertical section disposed between the non-linear configuration and the exit;
    wherein the spray nozzle is disposed between the entrance and the exit to spray water into the steam flow substantially in alignment with the steam flow so as to condense the steam flow, and wherein the non-linear configuration of the vent pipe prevents water sprayed from the spray nozzle to escape to the atmosphere.

2. The cooking device according to claim 1, wherein the non-linear configuration of the vent pipe is selected from the group consisting of: a curved section that branches off the vent pipe; an extension disposed away from the vertical sections of the vent pipe; a perforated disc disposed in a cross-sectional dimension of the vent pipe; a baffle arrangement of nor-intersecting plates; at least two reversing bends; and combinations of the foregoing.

3. The cooking device according to claim 2, wherein the non-linear configuration of the vent pipe comprises a curved section that branches of the vent pipe.

4. The cooking device according to claim 3, wherein the vent pipe is capped at an end of its unbranched section.

5. The cooking device according to claim 1, wherein the spray nozzle sprays water into the steam flow at an angle of incidence of from less than about 90° to about 0°.

6. The cooking device according to claim 5, wherein the spray nozzle sprays water into the steam flow at an angle of incidence of from less than about 20° to about 0°.

7. The cooking device according to claim 5, wherein the spray nozzle sprays water into the steam flow at an angle of incidence of about 0°.

8. A method of condensing steam flow produced in a cooking device, the cooking device comprising: a cooking chamber, wherein the cooking chamber has a top and a bottom and a drain disposed in the bottom, a vent pipe for allowing a steam flow from the cooking device to exit the cooking device to the atmosphere, and a spray nozzle for condensing the steam flow, the method comprising:
    disposing the vent pipe vertically outside of the cooking chamber between the top and the bottom, wherein the vent pipe has an entrance in communication with the drain for receiving the steam flow from the cooking chamber into the vent pipe and an exit in communication with the atmosphere for allowing the steam to flow from the vent pipe to the atmosphere,
    disposing a non-linear configuration between the entrance and the exit, wherein the vent pipe has a vertical section between the entrance and the non-linear configuration and a vertical section between the non-linear configuration and the exit;

positioning the spray nozzle between the entrance and the exit to spray water into the steam flow substantially in alignment with the steam flow to condense the steam flow; and preventing water sprayed from the spray nozzle to escape to the atmosphere through the vent pipe due to the non-linear configuration of the vent pipe.

9. The method according to claim 8, wherein the non-linear configuration of the vent pipe is selected from the group consisting of: a curved section that branches off the vent pipe; an extension disposed away from the vertical sections of the vent pipe; a perforated disc disposed in a cross-sectional dimension of the vent pipe; a baffle arrangement of non-intersecting plates; at least two reversing bends; and combinations of the foregoing.

10. The method according to claim 9, wherein the non-linear configuration of the vent pipe comprises a curved section that branches off the vent pipe.

11. The method according to claim 10, wherein the vent pipe is capped at an end of its unbranched section.

12. The method according to claim 8, wherein the spray nozzle sprays water into the steam flow at an angle of incidence of from less than about 90° to about 0°.

13. The method according to claim 12, wherein the spray nozzle sprays water into the steam flow at an angle of incidence of from less than about 20° to about 0°.

14. The method according to claim 12, wherein the spray nozzle sprays water into the steam flow at an angle of incidence of about 0°.

15. A condensation system for condensing steam flow from a cooking chamber having a top and a bottom and a drain disposed in the bottom, the condensation system comprising:

a vent pipe for allowing the steam flow to exit the cooking chamber to the atmosphere, wherein the vent pipe is disposed vertically outside of the cooking chamber, wherein the vent pipe has (a) an entrance in communication with the drain for receiving the steam flow from the cooking chamber, (b) an exit in communication with the atmosphere for allowing the steam to flow to the atmosphere, (c) a non-linear configuration disposed between the entrance and the exit, (d) a vertical section disposed between the entrance and the non-linear configuration and (e) a vertical section disposed between the non-linear configuration and the exit; and a spray nozzle disposed between the entrance and the exit, wherein the spray nozzle sprays water into the steam flow substantially in alignment with the steam flow to condense the steam flow, and wherein the non-linear configuration of the vent pipe prevents water sprayed from the spray nozzle to escape the cooking chamber to the atmosphere.

16. A method of condensing steam flow from a cooking chamber having a top and a bottom and a drain disposed in the bottom, the method comprising:

disposing a vent pipe vertically outside of the cooking chamber between the top and the bottom, wherein the vent pipe has an entrance in communication with the drain for receiving the steam flow from the cooking chamber into the vent pipe and an exit in communication with the atmosphere for allowing the steam to flow from the vent pipe to the atmosphere;

disposing a non-linear configuration between the entrance and the exit, wherein the vent pipe has a vertical section disposed between the entrance and the non-linear configuration and a vertical section disposed between the non-linear configuration and the exit;

allowing the steam flow to exit the cooking chamber into the vent pipe; and disposing a spray nozzle between the entrance and the exit, wherein the spray nozzle sprays water into the steam flow substantially in alignment with the steam flow to condense the steam flow.

\* \* \* \* \*